Figure 1:
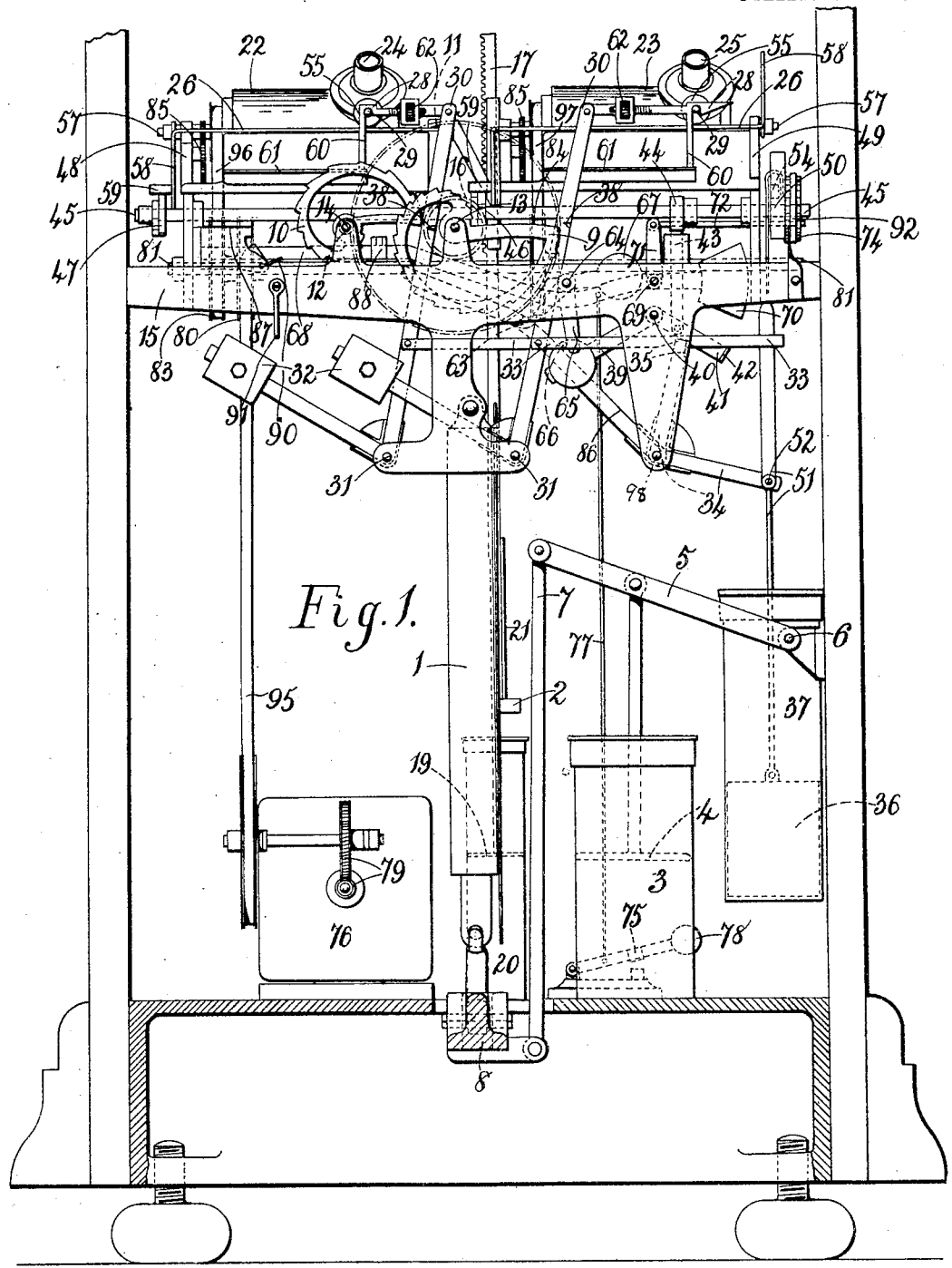

No. 803,125. PATENTED OCT. 31, 1905.
C. S. McINTIRE.
WEIGHING MACHINE COMBINED WITH AUTOMATIC SOUND PRODUCING
MECHANISM.
APPLICATION FILED MAR. 19, 1904.

4 SHEETS—SHEET 1.

Witnesses.
A. L. Annison
Frank F. Meadows

Inventor.
C. S. McIntire.
By Arthur H. Stanley
Attorney.

No. 803,125. PATENTED OCT. 31, 1905.
C. S. McINTIRE.
WEIGHING MACHINE COMBINED WITH AUTOMATIC SOUND PRODUCING MECHANISM.
APPLICATION FILED MAR. 19, 1904.

4 SHEETS—SHEET 3.

Witnesses.
A. L. Annison
Frank F. Meadows

Inventor.
C. S. McIntire.
By Arthur H. Stanly
Attorney.

No. 803,125. PATENTED OCT. 31, 1905.
C. S. McINTIRE.
WEIGHING MACHINE COMBINED WITH AUTOMATIC SOUND PRODUCING
MECHANISM.
APPLICATION FILED MAR. 19, 1904.

4 SHEETS—SHEET 4.

Witnesses
A. L. Annison
Frank F. Meadows

Inventor
C. S. McIntire
By Arthur H. Stanley
Attorney

UNITED STATES PATENT OFFICE.

CHARLES S. McINTIRE, OF LONDON, ENGLAND, ASSIGNOR OF ONE-HALF TO JOHN SHEPHERD SAWREY, OF LONDON, ENGLAND.

WEIGHING-MACHINE COMBINED WITH AUTOMATIC SOUND-PRODUCING MECHANISM.

No. 803,125.      Specification of Letters Patent.      Patented Oct. 31, 1905.

Application filed March 19, 1904. Serial No. 198,983.

*To all whom it may concern:*

Be it known that I, CHARLES SHIELDS MC-INTIRE, a citizen of the United States of America, residing at 20 Bucklersbury, London, E.C., England, have invented certain new and useful Improvements in or Relating to Weighing-Machines Combined with Automatic Sound-Producing Mechanism, of which the following is a specification.

This present invention relates to weighing-machines combined with automatic sound-producing mechanism so that the accurate weight of the person or object shall be audibly announced and also, if desired, advertisements or other announcements audibly made or sounds of any other kind produced.

The machine according to the present improvements consists of five essential parts—namely, a weighing-machine, which may be of any ordinary construction, a record surface or surfaces, devices for bringing the sound box or boxes into proper position, driving mechanism for operating the phonographs or gramophones and for starting the gear which brings the mechanism to rest, and, lastly, means for restarting the driving mechanism.

The weighing-machine may consist of the usual platform carried on compound levers combined with a vertical spring-balance or dead-weight mechanism and also a dash-pot, if needed, the pointer being in the form of a projecting pin, which moving vertically stops at varying positions according to the weight upon the platform.

The machine possesses the advantages of simplicity in construction and reliability of operation when subjected to the severe tests to which all public automatic machines are put.

The record-surfaces may be such as employed in phonographs, which may be of the well-known Edison type, the record-cylinders having records denoting different weights at suitable intervals along their lengths.

The mechanism shown is constructed according to the English system of weights indicating pounds and stones, one stone containing fourteen pounds. Although the present description will relate particularly to this construction of machine, it is obvious that the latter can easily be adapted to suit the metrical or any other system of measurement, as will be more fully referred to hereinafter. As shown on the drawings, one cylinder carries the records of pounds from one to thirteen and the other the record of stones from one to, say, twenty. The latter would thus, for instance, be worded: "You weigh nine stone," "You weigh ten stone," &c., and the former "and one pound" "and two pounds," &c. Additional announcements may be made to come in before or after or during the announcement of the weight.

The working and the timing of the various parts so as to produce the desired result is performed mainly by a shaft carrying cams, said shaft being rotated by means of an electric motor or other suitable mechanism which is automatically stopped at the end of the operation by one of the said cams. The mechanism is started, as in an automatic machine, by the well-known "penny-bucket."

Reference will hereinafter be made to the accompanying drawings, wherein—

Figure 2:
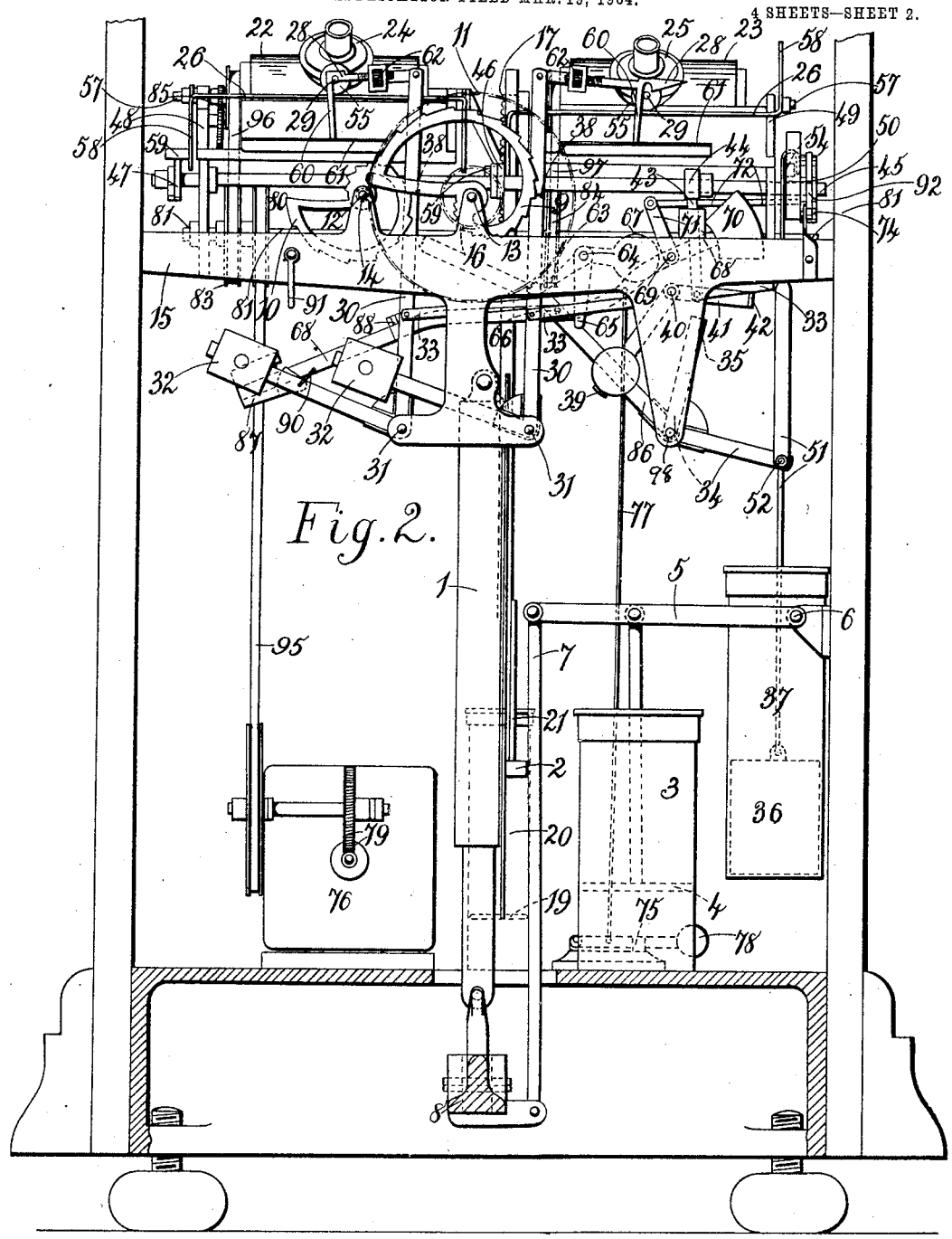
Figure 3:
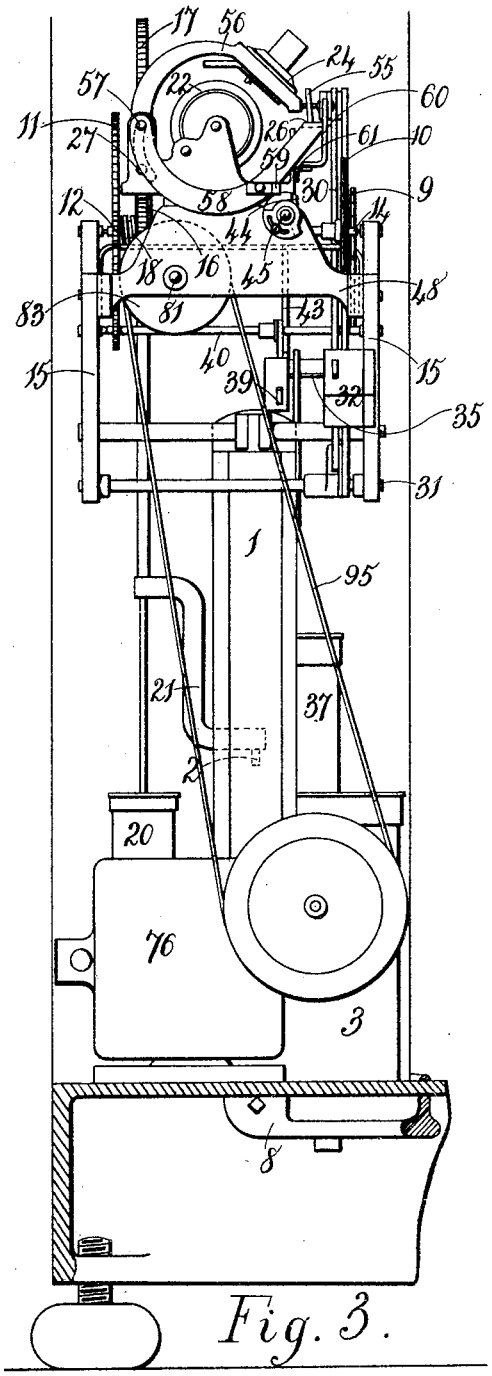
Figure 4:
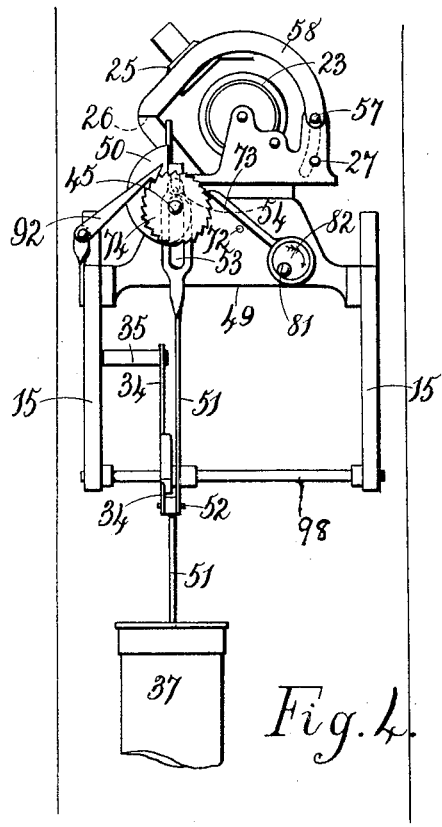
Figure 5:
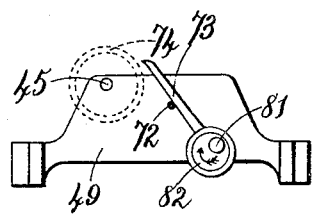
Figure 6:
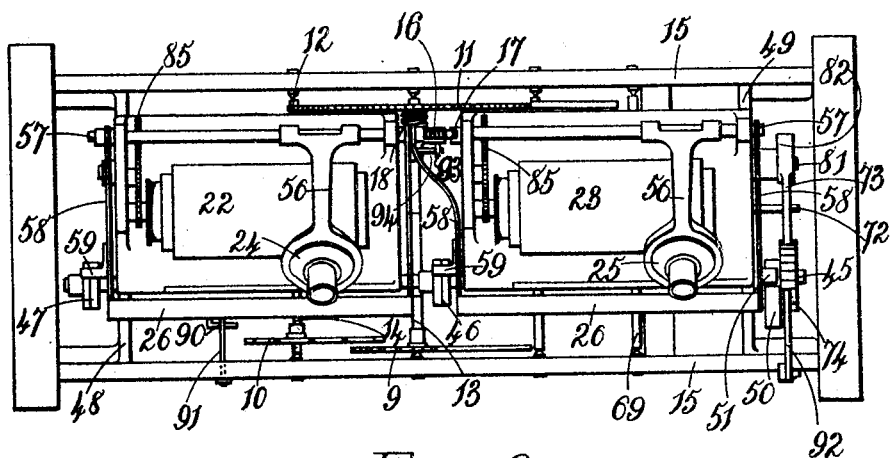
Figure 7:
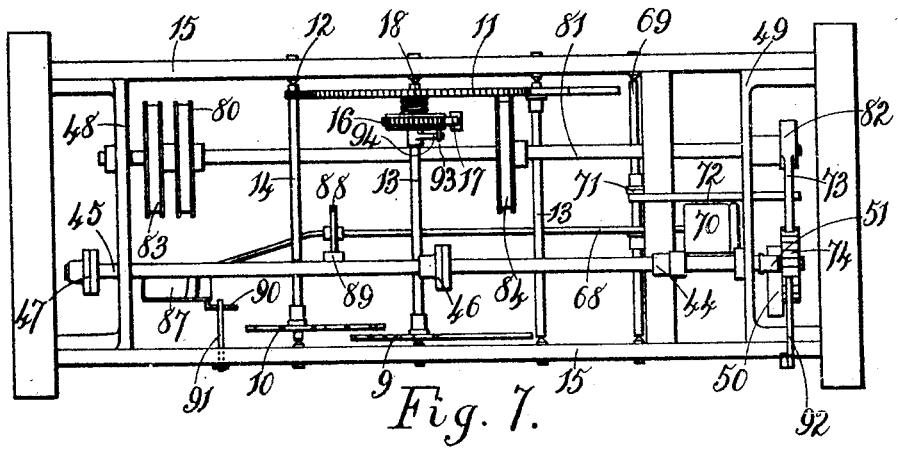

Figure 1 is a front elevation of the mechanism when at rest. Fig. 2 is a similar view when the parts are in actual operation. Fig. 3 is an end elevation of the mechanism as in Fig. 2. Fig. 4 is an end elevation showing the driving-gear of the cam-shaft. Fig. 5 is a detail of Fig. 4. Fig. 6 is a plan of the phonographs and some parts of the mechanism, and Fig. 7 is a plan of parts of the mechanism below the phonographs.

The same reference characters throughout the figures indicate the same or corresponding parts.

It is assumed in this present specification that two phonographs are used, as above suggested and as herein illustrated. It will be understood, however, that a single record-surface or two or more independent surfaces may be used to meet varying circumstances.

The weighing-machine consists of a platform carried on ordinary compound levers, which have one end attached to the vertically-movable rod of a spring-balance 1, as shown, the pointer which is usually fitted to spring-balances being replaced by a pin 2, projecting from said rod, which pin will travel varying distances according to the weight placed on the platform in exactly the same manner as the pointer it replaces. A dash-pot 3 may be provided to steady the motion of the platform, the connection to the piston 4 of the dash-pot being made by a lever 5, pivoted to the frame at 6 at one end and to a rod 7 at the other end, the lower extremity of said rod being attached to the end of the lever 8. Said lever 8 is situated at the free end of a set of compound levers, which bear the load on the platform and which are so fulcrumed as to give to the lever 8 a considerable travel, thereby producing great sensitiveness in the mechanism with which it is connected. The dash-pot is not in every case essential. A pair of stepped cams 9 and 10 is employed, connected together by means of a spur-wheel 11 and pinion 12, carried, respectively, on two parallel spindles 13 and 14, mounted horizontally across the frame 15. The number of teeth in the spur-wheel is when the machine is intended to indicate pounds and stones as many times that in the pinion as the maximum number of stones which the machine can indicate. Thus for a machine which is constructed to weigh up to twenty stone the spur-wheel may have two hundred and forty teeth and the pinion twelve teeth, the spur-wheel being adapted to make one complete revolution when a weight of twenty stones is placed on the platform. For smaller weights it will of course move through a proportionately less distance.

Mounted loosely upon the same spindle as the stepped cam 9 is the tooth-wheel 16, which gears with the rack 17 and is connected with the spur-wheel 11 by means of the helical spring 18, Figs. 3, 6, and 7. This rack may carry at its lower extremity a piston 19, working in a dash-pot 20, and it has an extension 21, which rests on the pin 2 of the spring-balance in such a manner that when the rod of the latter is moved downward the rack, following it by gravity, turns the spindle 13 and the stepped cams 9 and 10 through the medium of a pin 93, fixed in the side of the wheel 16, and an arm 94, fixed on the spindle 13, said pin and arm being kept normally in engagement with one another by means of the spring 18. Each step of the larger cam 9 represents one stone, and it makes a complete revolution for twenty stone, and each step on the small one 10 represents one pound, and it makes a complete revolution for every step of the cam 9.

The cylinders of the two phonographs have records of different weights at equal intervals along their length. One of these, 22, carries the record of pounds from one to thirteen, and the other, 23, the record of stones from one to twenty.

Each of the sound-boxes 24 and 25, hereinafter termed "sounders," during inaction is held away from the record-cylinders by a movable table 26, which in raised position keeps the styluses free (see Figs. 2 and 3) until each sounder has been brought into position over that part of the record-surface which answers to the weight to be ascertained, whereupon the tables become successively lowered, causing the sound-styluses to engage with the phonograph-cylinders and the leading screw 27 (see Figs. 3 and 4) to move them along the surface of the records. The mechanism for previously pulling the sounders to the starting end of the phonograph-cylinders—i. e., to the limit they will be permitted to go by the steps on the cams—may comprise in each instance a hook-ended link 28, the hook of which drops by gravity over a stud 29 on the box, while the other end is supported and hinged on a lever 30, extending downwardly and pivoted to the frame 15 at 31 31. These levers 30 30 are provided with means which tend to draw their upper ends toward the starting-points of the records, for which purpose they may be bell-cranked, as shown, and provided with balance-weights 32 32. They are also provided with two long pawls 33 33. A third bell-crank lever 34 is mounted on an axle in the frame 15 and provided at its upper end with a projecting arm 35. The lever 34 is in its turn provided at one end with a balance-weight 36, working in a dash-pot 37, and this weight is of sufficient power to overcome the two weights 32 32 and to pull the sounders after each operation to the other end of the phonograph-cylinders. The levers 30 30 are further provided with two projecting stop-pins 38 38, and these pins are are ranged so that when the levers 30 30 move toward the starting-points of the records the pins come in contact with the steps of the cams, which together represent the load on the platform. When this occurs, the sounders will have been drawn to the correct positions above the phonograph-records, and if lowered onto the cylinders at the correct times when the latter are revolving the weight in stones on the platform will be called out by one cylinder and the additional weight (if any) in pounds by the other. A weighted arm 39 is mounted on a spindle 40 in the frame 15 and provided with a tail-arm 41, having a lateral extension 42 in such a way that when it is released the extension engaging with the long pawls 33 33 will lift them up, so that they are clear of the arm 35 of the lever 34 and so the levers 30 30 are free to move by the action of their respective weights 32 32 until the stop-pins 38 38 engage with the stepped cams, as already mentioned. The long pawls each have a notch on their under side for enabling the arm 35 when in engagement to draw them back at the end of an operation into the position shown in Fig. 1. These pawls are supported alternately by the arm 35 at one time (see Fig. 1) and by the extension 42 at another time. (See Fig. 2.) The weighted arm 39 is prevented from falling by means of a rod 43, rising from the tail-arm 41, the top of said rod coming in contact with a cam 44. This cam is mounted on a shaft 45, which also carries two other cams 46 and 47, said shaft being mounted in the end frames 48 49 of the machine. These cams are for the purpose of successively dropping and raising, first, the sounder announcing the stones and then that announcing the pounds. The same shaft also carries a fourth cam 50, whose function is to alternately raise and release the weight 36, being connected therewith by a vertical rod 51, which is pivoted to the arm 34 at 52 and is guided by means of a slot 53, Fig. 4, surrounding the cam-shaft 45. The rod 51 is bent over at its upper end, where it carries a roller 54, which rides upon the cam 50.

At the commencement of an operation the roller 54 lies within the angle of the cam 50. Consequently the weight 36 is at the bottom of its travel, having pulled back the levers 30 30 by the connecting-pawls 33 33. During an operation the weight 36 becomes gradually raised by means of the cam 50 and the operation is completed, when it is released by reason of the roller 54 falling again into the angle of the cam 50. The raising and lowering of the sounders is effected, as already mentioned, by means of two tables, one to each. Each of these tables consists of a flat strip or shelf 26, on which a roller 55 is arranged to roll. This roller is fixed at the extreme end of the arm 56, Figs. 3 and 6, carrying the sounder. The tables are arranged to rise and fall and are pivoted from a rod 57 at the back of the phonographs by means of two arms 58 58, one at each end of each table. One arm of each pair is provided with a projecting lug 59, and these lugs are arranged to rest on the cams 46 and 47, respectively. When the tables 26 26 are dropped in succession by the action of said cams, the sound-box styluses successively engage with the surfaces of the cylinders, and the half-nuts, (with which all phonographs are fitted,) which have hitherto been free, then mesh with the leading screws 27, Figs. 3 and 4, the rotation of which gives the necessary travel to the sounders.

The hooks 28 28 already described, which carry the sounders into their required positions, are provided with tailpieces 60 60, and these are arranged to slide on fixed shelves or rests 61 61, so that when, owing to the fall of the tables 26 26, the sounders are in their lowest positions the hooks shall cease to engage with the studs 29, thus permitting the necessary travel during the working of the phonographs without any restraint. In case of variation in the position of the records on the speaking-cylinders the hooks 28 28 may be provided each with an adjusting-nut 62.

To lock the spur-wheel 11 and stepped cams in their temporary positions, a weighted or similarly-governed brake 63, having teeth which engage the teeth of the spur-wheel 11, is mounted on a spindle 64. This spindle carries a depending arm 65, which is arranged to engage with a projecting pin 66 on one of the long pawls 33. So long as this pawl is in its initial or starting position the pin 66 holds the brake out of gear; but as soon as the long pawls 33 33 are released by the action of the extension 42 they are free to move into working position, and the balance-weight 67 of the brake is allowed to fall and bring the brake into action.

The means for setting the machine in motion are as follows: The coin-bucket arm 68 is mounted on an axle 69 and provided, as usual, with the counterbalance-weight 70. The axle 69 also carries fast thereon a radial arm 71, hinged to a practically horizontal rod 72, the end of said rod before the bucket falls protruding underneath, and thereby supporting the pawl 73, as seen in Fig. 5, and preventing the same from dropping upon the ratchet-wheel 74, which is fast upon the cam-shaft 45. I prefer to employ an electric motor, in which case the bucket-arm 68 is connected to the switch 75 of the motor 76 by a cord or the like 77, so that when the bucket drops, as shown in Fig. 2, by the weight of the penny or other coin the switch 75, which may be weighted by a weight 78, falls automatically into operation and starts the motor, which by means of suitable gearing, such as worm-gearing 79, transmits motion through a belt 95 and pulley 80 to the driving-shaft 81, bearing the eccentric 82 at the farther end, Figs. 4 to 7, which gives movement to the above-mentioned pawl 73. Two other pulleys 83 and 84, fast on the driving-shaft 81, transmit motion to the phonograph-cylinders 22 and 23 by means of belts 96 and 97, the leading-screws 27 receiving their motion from the cylinders through the medium of the trains of wheels 85 in the usual way. Simultaneously with and owing to the fall of the bucket 87 the end of the rod 72 becomes withdrawn from under the pawl 73, and the latter consequently drops upon the ratchet-wheel 74 and rotates the cam-shaft 45, thus bringing into operation the cams which play so important a part in the cycle of performances which go to make up a complete operation during a single revolution of said shaft. The machine is brought to rest by the cam 50 releasing the weight 36, which has all the time been rising, thus turning the axle 98, to which it is connected by the lever 34. Said axle 98 carries also a radial arm 86 for tripping the coin-bucket 87 in order to liberate the coin, as follows: The bucket-lever 68 has attached thereto a small bracket carrying a short lever 88, which is maintained in a normally horizontal position by means of a weight 89, Fig. 7, thereon. When the arm 86 moves downward, it passes idly over the end of lever 88, simply tipping up its weighted end; but the arm 86 during its upward movement strikes the lever 88, the weighted end of which is prevented from moving downward by means of a stop in the bracket, and thereby raises the lever 68. During the ascent of the latter an arm 90 of the penny-bucket 87 strikes a catch-pin 91, and so releases the coin from the bucket. The bucket now being relieved of the weight accordingly rises to its original position, as shown in Fig. 1, and in doing so opens the switch 75, thus stopping the motor and bringing the end of the rod 72 again under the pawl 73, thus disconnecting and suddenly stopping the camshaft 45 and making its position of rest quite independent of the stopping-point of the driving-shaft 81, which it is practically impossible to adjust in order to stop it at any particular point, owing to the momentum of the motor, &c., the cam-shaft being thereby left in exactly the right position for recommencing the operation. The cam-shaft is prevented from moving backward by means of a pawl 92, Figs. 1, 2, and 4. The spring 18 is employed for the purpose of preventing shock to the mechanism when the load is suddenly removed, especially if this happens before the brake 63 is released from the spur-wheel 11— for instance, if a person steps prematurely off the platform of the machine. In such a case the rack 17 in rising would turn the wheel 16, causing the pin 93 to leave the arm 94, part of the upward thrust of the rack 17 being stored up in the spring 18, permitting the wheel 11 to either lag behind or remain locked by the brake without undue strain on the teeth, the recoil of the spring bringing said wheel back if or when unlocked into its initial position.

I claim—

1. A weighing-machine in combination with a record, a sounder, a variable stop for controlling the relative positions of the record and the sounder, and means for causing the record and the sounder to produce audible announcements.

2. A weighing-machine in combination with records, sounders, variable stops for controlling the relative positions of the records and the sounders, and means for causing the records and the sounders to produce audible announcements.

3. A weighing-machine in combination with records, sounders, variable stops for controlling the relative positions of the records and the sounders, means for varying the positions of the stops in accordance with the load, and means for causing the records and the sounders to produce audible announcements.

4. A weighing-machine in combination with a record, a sounder, a variable stop for controlling the relative positions of the record and the sounder, means for varying the position of the stop in accordance with the load, and means for causing the record and the sounder to produce audible announcements.

5. A weighing-machine in combination with records, sounders, variable stops for controlling the relative positions of the records and the sounders, means for varying the positions of the stops in accordance with the load, means for causing the sounders to engage successively with their particular records, and means for causing the records and the sounders to produce audible announcements.

6. A weighing-machine in combination with records, sounders, variable stops for controlling the relative positions of the records and the sounders, means for connecting together said variable stops whereby their kinetic ratio is suited to the system of weights in vogue, means for varying the position of one of said stops in accordance with the load, and means for causing the records and the sounders to produce audible announcements.

7. A weighing-machine in combination with a record, a sounder, a variable stop for controlling the relative positions of the record and the sounder, means for varying the position of the stop in accordance with the load, a half-nut connected with the sounder, a rotatable leading-screw, means for causing engagement and disengagement of the half-nut and the leading-screw, and means for causing the record and the sounder to produce audible announcements.

8. A weighing-machine in combination with records, sounders, variable stops for controlling the relative positions of the records and the sounders, means for varying the positions of the stops in accordance with the load, half-nuts connected with the sounders, a rotatable leading-screw, means for causing engagement and disengagement of the half-nuts and the leading-screw, and means for causing the records and the sounders to produce audible announcements.

9. A weighing-machine in combination with a record, a sounder, a variable stop for controlling the relative positions of the record and the sounder, means for causing the record and the sounder to produce audible announcements, and means for automatically stopping the sound-producing mechanism.

10. A weighing-machine in combination with records, sounders, variable stops for controlling the relative positions of the records and the sounders, means for causing the records and the sounders to produce audible announcements, and means for automatically stopping the sound-producing mechanism.

11. A weighing-machine in combination with a record, a sounder, a snail mounted upon a spindle, means for causing the snail to rotate through an angle directly proportionate to the load, means for locking said snail in position for indicating the weight, said snail acting as a variable stop for limiting the relative travel of the record and sounder, and means for causing the record and the sounder to produce audible announcements.

12. A weighing-machine in combination with a record, a sounder, a snail mounted upon a spindle, means for causing the snail to rotate through an angle directly proportionate to the load, means for locking said snail in position for indicating the weight, said snail acting as a variable stop for limiting the relative travel of the record and sounder, means for causing the record and the sounder to produce audible announcements, and means for automatically stopping the sound-producing mechanism.

13. A weighing-machine in combination with records, sounders, a snail mounted upon a spindle, means for causing the snail to rotate through an angle directly proportionate to the load, a spur-wheel mounted upon the same spindle and rigid with the snail, a brake-arm adapted to lock the spur-wheel when it has arrived at the weight-indicating position, a second snail mounted on a shaft carrying a pinion gearing with the spur-wheel in a ratio suited to the system of weights which may be in use, so that, a progression of one step or graduation of the first snail will produce one revolution of the second snail said snails acting as variable stops for limiting the travel of the sounders and the records relatively to one another before they come into engagement, means for bringing the records and sounders into and out of engagement, and means for causing the records and the sounders to produce audible announcements.

14. A weighing-machine in combination with records, sounders, a snail mounted upon a spindle, means for causing the snail to rotate through an angle directly proportionate to the load, a spur-wheel mounted upon the same spindle and rigid with the snail, a brake-arm adapted to lock the spur-wheel when it has arrived at the weight-indicating position, a second snail mounted on a shaft carrying a pinion gearing with the spur-wheel in a ratio suited to the system of weights which may be in use, so that, a progression of one step or graduation of the first snail will produce one revolution of the second snail, said snails acting as variable stops for limiting the travel of the sounders and the records relatively to one another before they come into engagement, means for bringing the records and sounders into and out of engagement, means for causing the records and the sounders to produce audible announcements, and means for automatically stopping the sound-producing mechanism.

In witness whereof I have hereunto set my hand in the presence of two witnesses.

C. S. McINTIRE.

Witnesses:
   JOHN P. PAWNEY,
   J. A. SCRIVENER.